United States Patent
Alexandre et al.

(10) Patent No.: US 9,446,860 B2
(45) Date of Patent: Sep. 20, 2016

(54) AIRCRAFT PART AND SUBASSEMBLY DAMAGE REPORTING METHOD, SYSTEM AND MOBILE COMPUTER SOFTWARE APPLICATION

(71) Applicant: Airbus Operations (SAS), Toulouse (FR)

(72) Inventors: Mudler Alexandre, Toulouse (FR); Barizza Laurent, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 303 days.

(21) Appl. No.: 14/046,282

(22) Filed: Oct. 4, 2013

(65) Prior Publication Data

US 2015/0100201 A1    Apr. 9, 2015

(51) Int. Cl.
*B64F 5/00* (2006.01)
*G06F 3/0484* (2013.01)
*G06Q 30/06* (2012.01)
*G06Q 10/08* (2012.01)

(52) U.S. Cl.
CPC ........... *B64F 5/0045* (2013.01); *B64F 5/0081* (2013.01); *G06Q 30/0633* (2013.01)

(58) Field of Classification Search
CPC .. B64F 5/0045; B64F 5/0081; G06F 3/0484; G06Q 30/0633
See application file for complete search history.

(56) References Cited

U.S. PATENT DOCUMENTS

| | | | |
|---|---|---|---|
| 5,828,969 A * | 10/1998 | Chamney et al. | 702/35 |
| 8,401,729 B2 | 3/2013 | Rouyre | |
| 2005/0055239 A1* | 3/2005 | Farmer | 705/1 |
| 2007/0010923 A1* | 1/2007 | Rouyre | 701/29 |
| 2007/0061109 A1* | 3/2007 | Wilke et al. | 702/183 |
| 2009/0138139 A1* | 5/2009 | Tsai et al. | 701/3 |
| 2009/0257070 A1* | 10/2009 | Baird et al. | 358/1.5 |
| 2009/0281993 A1* | 11/2009 | Hadley et al. | 707/3 |
| 2010/0042361 A1* | 2/2010 | Hadley et al. | 702/152 |
| 2011/0137615 A1* | 6/2011 | Motzer et al. | 703/1 |
| 2012/0300984 A1* | 11/2012 | Dann et al. | 382/103 |
| 2012/0306666 A1 | 12/2012 | Xu et al. | |
| 2013/0166458 A1* | 6/2013 | Wallner et al. | 705/305 |
| 2014/0184786 A1* | 7/2014 | Georgeson et al. | 348/128 |

FOREIGN PATENT DOCUMENTS

| | | |
|---|---|---|
| EP | 1 280 316 | 2/2007 |
| WO | WO 2011104167 A1 * | 9/2011 |
| WO | WO 2012/172320 | 12/2012 |

* cited by examiner

*Primary Examiner* — Dale Moyer
(74) *Attorney, Agent, or Firm* — Greer, Burns & Crain, Ltd.

(57) ABSTRACT

A preferred method of the invention is executed by code stored on a non-transient medium to control a portable computing device with a touchscreen. The code generates graphical interfaces includes an application that allows a user to capture necessary data for reporting data to permit quick and efficient diagnoses of repairs by a repair service to a part or sub-assembly of an aircraft. The data acquisition is controlled and guided with reference to actual aircraft specifications that are updated by an aircraft part supplier, such as an aircraft manufacturer.

14 Claims, 8 Drawing Sheets

Corrosion :       64

Dimensions = \_\_\_\_\_\_\_\_\_\_\_\_\_\_
Depth = \_\_\_\_\_\_\_\_\_\_\_\_\_\_
Type of corrosion = \_\_\_\_\_\_\_\_\_\_\_\_\_\_

66

[ Click here to take picture ]

Scratch / gouge / rework...    64

Dimensions = \_\_\_\_\_\_\_\_\_\_\_\_\_\_
Depth = \_\_\_\_\_\_\_\_\_\_\_\_\_\_
Type of corrosion = \_\_\_\_\_\_\_\_\_\_\_\_\_\_

66

[ Click here to take picture ]

[ Additional corrosion / scratch... ]       [ Validate ]

FIG. 11B

72
[ Additional damage ]

74
[ Edit the report of the damage ]

FIG. 12

Additional information

| Comments |  |
|---|---|
| Action performed |  |
| Request / proposal |  |

A/C information
MSN  ——
FC   ——
FH   ——
SN   ——
OPERATOR ——
CHECK ——
TASK ——

74

[ EDIT THE REPORT ]

FIG. 13

AIRCRAFT PART AND SUBASSEMBLY DAMAGE REPORTING METHOD, SYSTEM AND MOBILE COMPUTER SOFTWARE APPLICATION

FIELD OF THE INVENTION

Fields of the invention is aircraft testing, inspection and parts ordering.

BACKGROUND

During service lifetime, all airplanes are subject to regular inspections. The inspections are necessary maintain the aircraft in flight readiness. Flight readiness includes meeting safety guidelines, which are critical. In addition, flight readiness includes detecting and repairing minor problems that can lead to larger problems. In addition, during initial assembly or repair of an aircraft, defects can be discovered parts or sub-assemblies.

All in-service aircrafts are subject to damages such as impacts, lightning strikes, corrosion, fatigue cracks, etc, during normal operation. When a problem is identified that requires repair or replacement or a part or subassembly, the time required to obtain a replacement part or subassembly is of utmost importance. When an aircraft is being assembled, delays in obtaining a replacement part or subassembly can lead to production delays. Such delays have the potential to damage the reputation and profitability of a manufacturer. Customers expect orders to be filled on time and per contract terms.

In the case of in-service aircraft, the criticality of prompt part or subassembly replacement is enhanced. Out of service aircraft cost airlines valuable service hours. Out of service aircraft can also cause fleet scheduling difficulties. Service periods for aircraft are therefore ideally as short as possible.

Unfortunately, the identification of a defective part or subassembly is only an initial step. The inspection process itself is time-consuming. Exacerbating the potential time delays is the process of precisely identifying (such as by part number or part number in a manner sufficient to order replacement) and then ordering a correctly identified part or subassembly. Despite the sophistication of inspection equipment, e.g., non-destructive testing equipment, and the sophistication of modern airplane design and assembly, which includes computer aided designs and guidance, the parts order process remains basic and cumbersome in practice. Skilled technicians often have to obtain identifying information from a part, and then use an order form (paper or electronic, such as through a web or other computer interface) to order parts. Research may also be required to identify the part. The order forms for obtaining parts can require part number information and precise descriptions of parts. Misidentifications or inaccurate descriptions can result in incorrect part or assemblies being ordered, or additional communications to resolve problems identified upon review and evaluation of an order for a particular part or subassembly In the case of in-service aircraft, the part ordering process can be frustrating and expensive in terms of hours worked on both a customer and supplier side. In common instances, the customer is an airline that has an aircraft with a damage report and the supplier is an aircraft manufacturer or an aircraft part manufacturer or supplier. Typically, the customer will research and complete a damage report form. This form may be transmitted electronically, but is often communicated in some other form such as a hard copy form or via a telephone report to a customer service representative at the supplier. The reception of a damage report creates a report evaluation process on the supplier side. In the typical case where the supplier is an aircraft manufacturer and the customer an airline, the airline often uses its own damage report form. When presented to the aircraft manufacturer with the template of the airline, the damage reports often lack clarity and/or information necessary for the aircraft manufacture to act. When a report is incomplete or includes mistakes, then this creates a cycle of communication on the supplier side as well as with the customer. Delays result as employee work hours are consumed.

The aircraft industry is much more complex than almost any other industry. While there have been many computer based systems for ordering parts or ordering goods in general, the computer based systems for ordering parts or ordering goods in general are inapplicable to airplane inspection and part ordering. As a result, airline inspection teams and aircraft manufacturers still use highly cumbersome, slow and inefficient processes to achieve parts ordering.

The parts order process related to aircraft remains cumbersome and inefficient despite the existence of detailed computer specifications for aircraft and despite computer aided methods for the damage inspection of aircraft.

WO 2012172320 discloses computer implemented methods for inspection of aircraft components. The methods and systems described in that document aid on-going maintenance checks for maintenance programs approved and overseen by airworthiness bodies such as the Federal Aviation Administration (in the US), Transport Canada or the European Aviation Safety Agency. The systems and methods concern horoscope inspections and image data is captured during an inspection. The horoscope includes interfaces to guide the inspection, and the obtained data is compared to reference data to aid in the assessment of the part. Based upon the comparison, an inspector may be prompted to conduct additional tasks. The disclosed system aids in actual inspection, but does not provide any improvement with respect to the ordering of parts or subassemblies.

U.S. Pat. No. 8,401,729 discloses a diagnostic tool for aircraft. The computer aided system provides an accessible aircraft repair manual on a central database. The database also includes information about aircraft models in digital form. A portable computer device, such as a tablet, can access the manual and aircraft information. A visual display can be provided in the computer device to aid in the collection of data by aiding in the selection of a part being identified and in the acquisition about damage data concerning the part. The company receiving the data, such as an airline company, uses the information to determine whether the information indicates and an aircraft is airworthy or of it should be grounded. The system aids in a quick determination of airworthiness and can also update damage records of the airline company or manufacturer. This provides a powerful tool for onsite aircraft airworthiness inspections and records collection.

EP 1280316 discloses an electronic operations and maintenance log system for aircraft. The system provides an aircraft operators forms in electronic versions to a portable device. Devices can be used to collect data from multiple users, and menus help a skilled used to identify possible faults with a part. The part is identified from a part code and use of drill down menus that are used to find a list of faults associate with the parts. The system provides an interface to the database for parts ordering based upon parts codes, to aid a part ordering process. This approach provides a user access to server records and also involves a cumbersome process for drilling through menus based upon part codes and descriptions.

US 2012/0306666 discloses an aircraft part control system that is an aid to the assembly of aircraft. With the system, an operator using a mobile device is a provided aid through the mobile device in locating a part necessary for an assembly procedure during the assembly of an aircraft. A sensor system in the mobile device notifies the user when the user is in a zone including the location of the part. This system speeds assembly by guiding a user to the storage location for the part. The system does not concern the ordering of replacement parts.

SUMMARY

A preferred method of the invention is executed by code stored on a non-transient medium to control a portable computing device with a touchscreen. The code generates graphical interfaces includes an application that allows a user to capture necessary data for a repair service to quickly diagnose a necessary report. The data acquisition is controlled and guided with reference to actual aircraft specifications that are stored in the portable computing devices or on local secure storage, such as secure storage integrated in the aircraft. The data acquisition includes detailed aircraft specifications and matches information that is being acquired by the user of the tablet with actual specifications of the aircraft and part or subassembly from the detailed aircraft specifications schematically presented to the user via the portable computing device.

DETAILED DESCRIPTION

Methods, systems, and portable devices with software applications of the invention aid the repair servicing of aircraft parts and subassemblies between a customer and a supplier that are two different entities, such as an airline and an aircraft manufacturer or other repair service. The entities will often have their own damage reporting systems. The invention facilitates and clarifies information, guides a user to complete missing information, presents an order interface and can automatically generate an e-mail or other communication to a customer service department of the aircraft manufacturer or other repair service.

A preferred tablet or other portable computing device with a touchscreen and camera includes an application that allows a user to capture necessary data for a repair service to quickly diagnose a necessary report and/or a part or subassembly needed for a repair. The data acquisition is controlled and guided with reference to actual aircraft specifications stored in the portable computer device (or accessed via local secure storage associated with the aircraft) and can be updated via a data connection by an aircraft part supplier, such as an aircraft manufacturer. The data acquisition includes detailed aircraft specifications and matches information that is being acquired by the user of the tablet with actual specifications of the aircraft and part or subassembly from the detailed aircraft specifications maintained by the aircraft part supplied, which is an aircraft manufacturer in preferred embodiments. The specifications are installed in the device or local storage, such as when an aircraft is manufactured or serviced, and can be updated. An airline inspection team using the tablet or portable computing device is guided with highly detailed aircraft specifications aiding the process.

A preferred tablet application of the invention can guide a user through the acquisition of necessary data regarding of a failure of an aircraft part or sub-assembly to automatically generate a report containing information in a format that allows a repair service to quickly provide a solution. Preferred methods of the invention are executed by a software stored in the non-transient memory on a portable tablet-style device. The software also accesses data securely stored on the tablet or on a secure local device associated with the aircraft that is accessed by the tablet device and that includes detailed aircraft specifications. The aircraft specification data is stored as read-only data that has upload and copy restrictions.

In a preferred embodiment, the secure local device is built into the plane. Access to the device is physically and/or electronically restricted to prevent unauthorized access and to prevent uploading or copying of information relating to the identification and production of the aircraft, including all varieties of design and design and manufacturing events that are stored on the secure device. With authorized access to this secure information, a tablet device including software of the invention can generate a damage report containing all the information needed to identify a repair solution. The information can be transmitted to a dedicated repair service lacks ambiguity and permits rapid identification of a repair solution. This saves time and promotes efficiency. This also provides for data collection that promotes harmonization and traceability of damage/repairs.

A user guided by an application on a tablet device obtains critical date for identification of a necessary repair solution and transmits a report to a repair service. The software generates graphical user interfaces through an application that allows a user to enter data required to identify a relevant portion of an aircraft. Data acquisition is guided by the characteristics of the aircraft (identified through the detailed specifications that schematically represent structural elements of the aircraft) and for different data damage (location, dimensions, nature etc. . . . . . ). Data acquisition therefore includes detailed specifications according to the location of the damage that is identified by the user with the aide of the application guidance. The data acquisition includes detailed aircraft specifications and matches information that is being acquired by the user of the tablet with actual specifications of the aircraft. Data can be integrated on secure storage on the aircraft to be accessed by a tablet, which may also be integrated in the assembly of the aircraft. The specifications are maintained on the secure storage, and can be up dated via connection to a database of the manufacturer, and an airline inspection team using the tablet or portable computing device is guided with the up-to-date specifications.

Those knowledgeable in the art will appreciate that embodiments of the present invention lend themselves well to practice in the form of computer program products. Accordingly, it will be appreciated that embodiments of the present invention may comprise computer program products comprising computer executable instructions stored on a non-transitory computer readable medium that, when executed, cause a computer to undertake methods according to the present invention, or a computer configured to carry out such methods. The executable instructions may comprise computer program language instructions that have been compiled into a machine-readable format. The non-transitory computer-readable medium may comprise, by way of example, a magnetic, optical, signal-based, and/or circuitry medium useful for storing data. The instructions may be downloaded entirely or in part from a networked computer. Also, it will be appreciated that the term "computer" as used herein is intended to broadly refer to any machine capable of reading and executing recorded instructions. It will also be understood that results of methods of the present invention may be displayed on one or more monitors or displays (e.g., as text, graphics, charts, code, etc.), printed on suitable media, stored in appropriate memory or storage, etc.

Preferred embodiments of the invention are particularly well-suited for tablet computer devices. Embodiments of the invention can be implemented in Tablets of various operating systems as Tablet Apps. Preferred embodiments are implemented in a C-based language (such as objective c or visual C++) or Java, or a web app based language such as HTML, CSS or JavaScript. In particular preferred embodiments of the invention, the language used to implement the invention on a particular tablet platform is able to use camera capabilities of the tablet device. Tablet, as used herein, refers to devices having what is often referred to as a tablet or mini size. While methods of the invention can be implemented on traditionally sized smart phones, the smaller screen sizes make usage more awkward.

Figure 1:
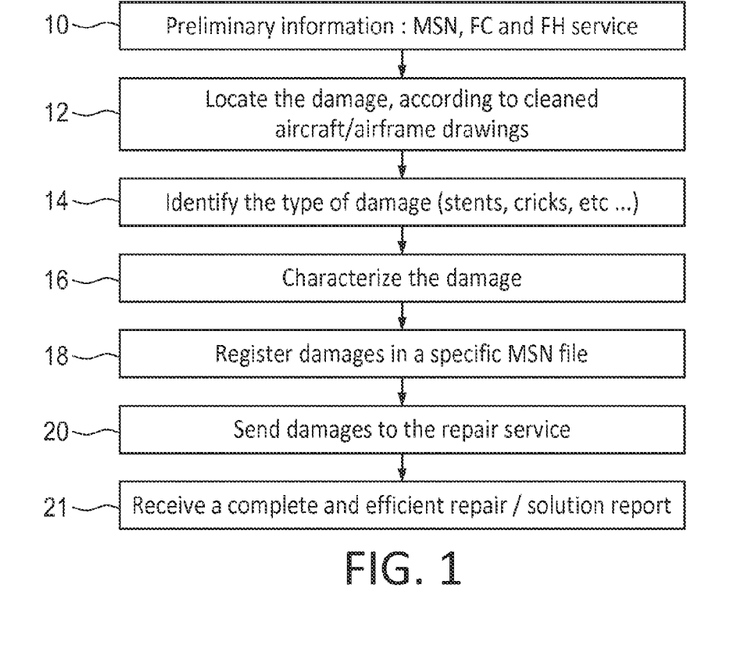
FIG. 1 is a block diagram of a preferred method of the invention for aircraft part and subassembly damage reporting.

Referring now to FIG. 1, a general method of the invention is shown, and the method is executed with communications between a portable device, such as a tablet computer, on an airline side, and a server interface on airline repair service (e.g., a manufacturer side), which receives a detailed damage report. An interface in graphical form with a representation of the aircraft from detailed engineering drawings is provided to obtain preliminary information 10 from the user with the aid of the tablet computer, e.g. MSN (manufacturer serial number), FC (flight cycles) and FH (flight hour) service. In preferred embodiments of the invention, the information 10 is automatically added and need not be obtained. In preferred embodiments when a tablet computer device of the invention for damage reporting is installed in the aircraft, no preliminary information is required as the information such as MSN, FC, and FH are known at the time of installation. In preferred embodiments, data is securely stored on a secure storage device that is part of the aircraft and the information is automatically added. The tablet computer can communicate with the secure storage device, or can itself store read-only data. Connection to a server, such as at an aircraft manufacturer permits updating of stored engineering detail level drawings from an up-to-date database maintained by the supplier. The detailed engineering drawings are then used to locate the damage 14 on the tablet computer with clean aircraft and/or airframe drawings. The user, for example, identifies a section of an aircraft and selects the section by touch. Additional engineering details are then presented within that section in a more zoomed view of that section. The selection of graphical engineering drawings continues until the part or subassembly is located. In a preferred embodiment, the detailed drawings would be stored in the tablet in order to avoid loadings from an external server with all security risks existing in uploading/downloading processes. However, with very restricted access rights and strong security software, the engineering drawings could also be stored on an eternal server and accessed remotely.

The tablet device in preferred embodiments includes read-only data having upload/download restrictions to secure against uploading/downloading. The engineering drawings for an aircraft are stored in the read-only memory. In the event of data failure, the software can provide access via secure remote or wireless connection to reach a database on the server of an aircraft manufacturer.

In other embodiments, the tablet device is integrated in an aircraft (such as being fixed in the cockpit or in the crew cabin) on delivery of the aircraft. The secure storage that is with the tablet or in a separate storage device includes data with several documents (design specifications, manufacturing events . . . ) and information (MSN, customers identification parts, main aircraft components identification number . . . ). These documents are typically provided on paper form at aircraft delivery, but are instead included in secure storage in this embodiment. Manufacturing events are preferably added to the final damage report so that a repair person can determine, for each damage event, if there had been any event during fabrication, which event had happened and which kind of repair was conducted. At the time of manufacture, a final report automatically adds identification values of the aircraft (MSN, SN) and of the users (airline identification code), which (in these embodiments) renders step 10 of FIG. 1 unnecessary.

In another embodiment, the tablet is used to photograph the applicable part on the actual aircraft that is damaged. The acquired image data aids in the confirmation of an appropriate action by the repair service of an airframe or aircraft section or assembly.

Damage is identified 14 on the tablet after engineering drawings graphically displayed on the table have been used to correctly identify a part or subassembly. Menus are then used to selection the type of damage, such as stents, cricks, cracks, warping, etc, via a guided menu. In addition, a photo of the damage is preferably acquired. The damage is then characterized 16 by type at the end of use of the menus. The damages, by description and also preferably with a photograph, are then registered in a specific MSN file. The damages description is then sent 20 to the repair service, such as a customer service department at an airline manufacturer. The description includes information, which may be encrypted without access provide to the user of the tablet, sufficient to precisely and unambiguously identify the damaged part or subassembly that needs to be repaired. The image files and other information can permit verification and can also be used to log information about part failures. The report is received 21 by a repair service and preferably includes information about the exact parts or sub-assemblies, and also information about the type of damage, the event that caused the damage, the severity of damage, and image data of the damage.

Figure 2A:
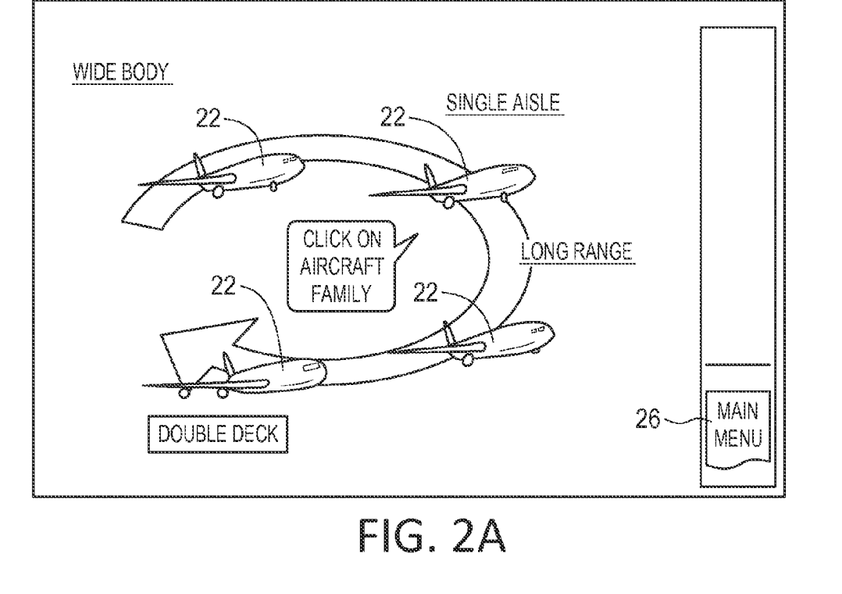
FIG. 2A shows an exemplary interactive welcome screen generated on a portable computing device by software code in accordance with a preferred embodiment of the invention.

Preferred tablet or other mobile device applications and methods of the invention can be well-understood by consideration of the user perspective and menus generated as in the following description. In FIG. 2A, a welcome screen for a tablet is shown. The welcome screen is touch active, and includes graphical representations of a number of aircraft families 22, along with textual information about each of the aircraft families 22. A menu button 26 permits selection of other screens in the application and helpful functions, e.g., zoom, color selection, and other typical graphical options. Similar screens are presented upon selection of an aircraft family to then select an appropriate aircraft.

Figure 2B:
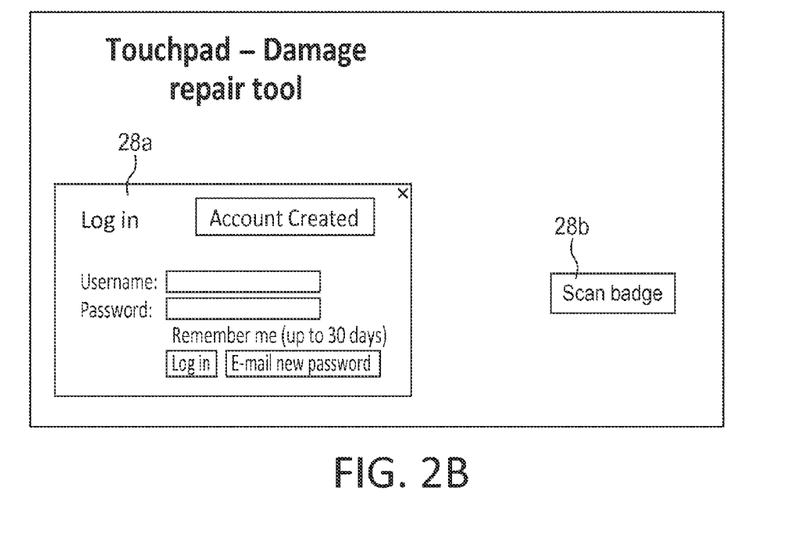
FIG. 2B shows an exemplary interactive security screen generated on a portable computing device by software code in accordance with a preferred embodiment of the invention.

Reaching the welcome screen preferably first requires security steps. A security screen view is shown in FIG. 2B. The view includes a login module 28a that permits access to the app upon entry and verification of a username and password that has been previously approved. Preferably, the security is two-level, and also requires that a previously issued identification badge associated with the user be scanned for verification purposes. Thus, the application limits the number of users and user access rights by adding a step of supplier validation to create the login account before entering the data and requiring an authentification step, such as by reading the user badge (with or without a chip, with or without a QR (quick response) code (▨)).

Figure 3:
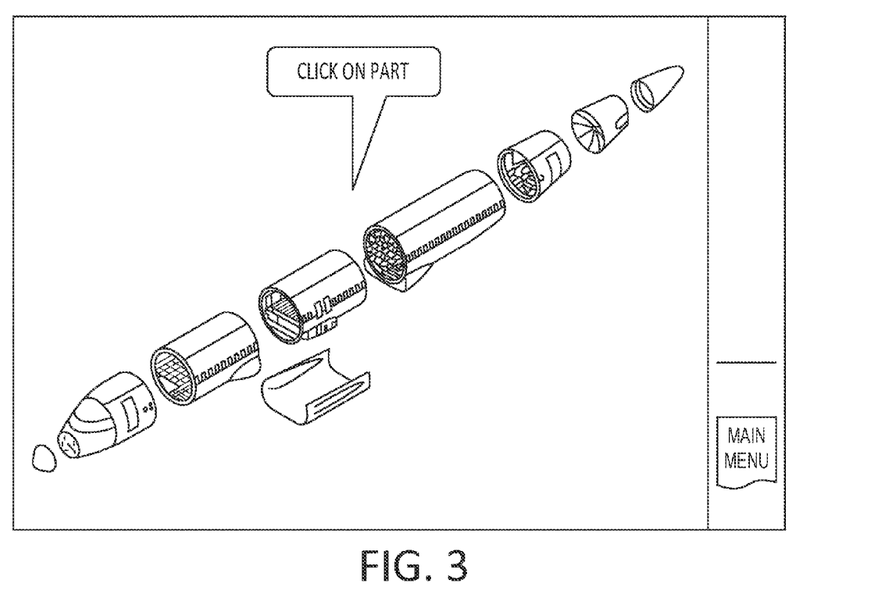
FIG. 3 shows an exemplary interactive aircraft assembly section generated on a portable computing device by software code in accordance with a preferred embodiment of the invention.
Figure 4:
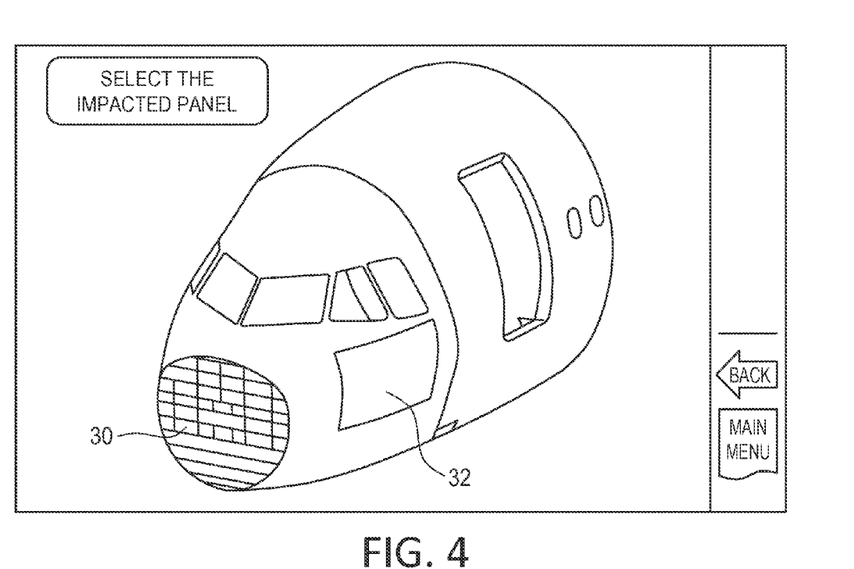
FIG. 4 shows an exemplary interactive aircraft panel selection screen generated on a portable computing device by software code in accordance with a preferred embodiment of the invention.

FIG. 3 shows an aircraft that has been selected and that is broken down into its basic assembly sections. Wings, landing gear, and tail assemblies are, of course, available in other similar views. The sections are touch active and can be used to further select one of the major fuselage sections. FIG. 4 shows the result of selecting a cockpit and adjacent section, which results in a touchpad view with a plurality of panel sections. The assembly shown in FIG. 4 can be rotated with touch gestures or through menu selections to facilitate selection of panels that are not visible in the view of shown in FIG. 4.

Figure 5:
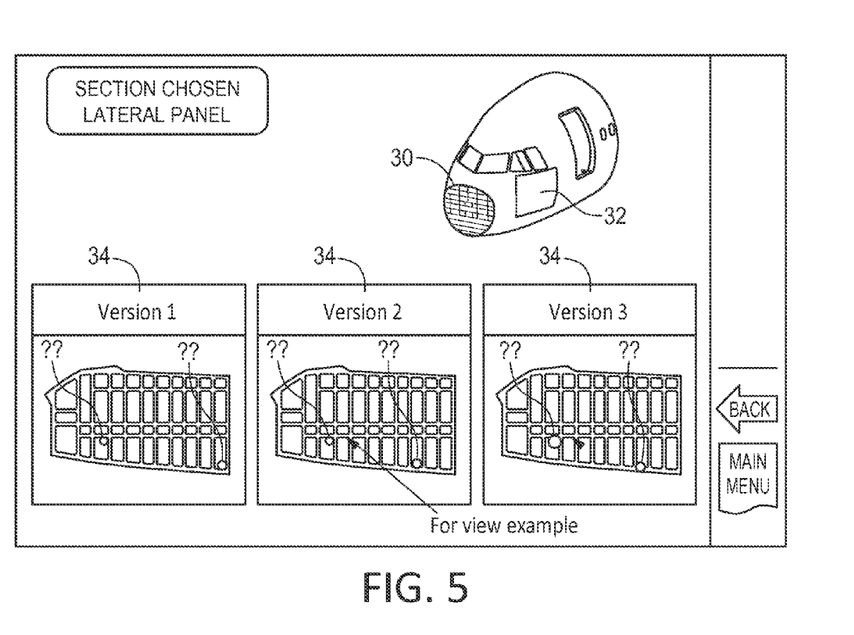
FIG. 5 shows an exemplary interactive aircraft module detail generated on a portable computing device by software code in accordance with a preferred embodiment of the invention.
Figure 6:
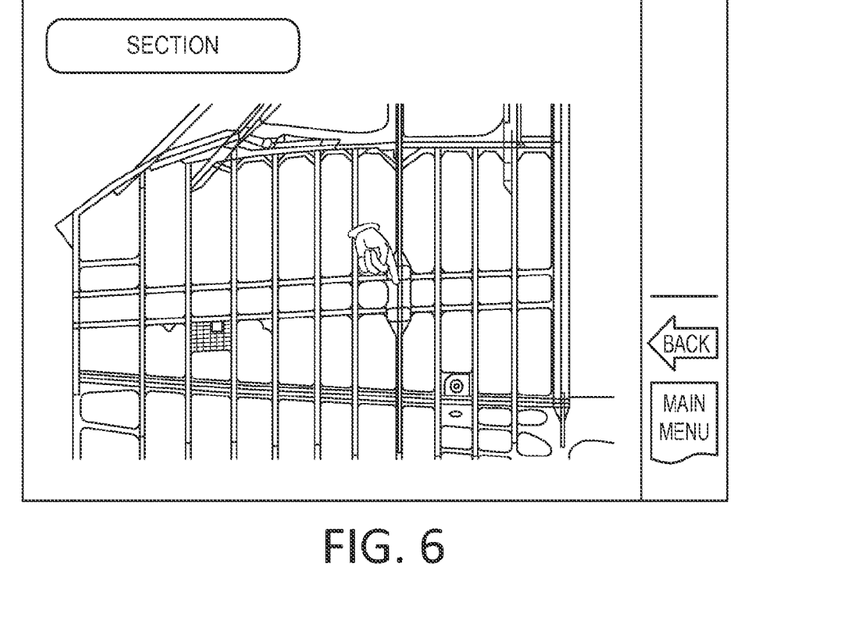
FIG. 6 shows an exemplary interactive engineering level detail generated on a portable computing device by software code in accordance with a preferred embodiment of the invention.

FIG. 5 illustrates selection of a module from the view of FIG. 4. In this view the selected section is illustrated in smaller graphic 30 to show a highlighted panel 32 that has been selected. The selection of the panel 32 with a hand pointer tool reveals additional module selection panels 34. The "??" indicates a menu that can help identify a pane module. The individual views are touch selectable, and a "view example" indicator is shown to permit further selection refinement via touch. The next level of refinement is shown in FIG. 6. There an addition view if available. In FIG. 6, the level of engineering detail in the presented views becomes clear and is at a level where an individual part is available to be viewed by selection. The software on the tablet presents a clean drawing of the applicable part when selected, which allows a user to select an accurate location of damage, which results in a detailed and clean engineering view of an impacted item shown in FIG. 7. This impacted item is also touch selectable. Parts shown in FIG. 7 include a pocket, fastener, stringer and frame. Multiple hand pointers can be used to indicate additional local parts that exhibit damage. A finish button is shown that indicates no more selections are desired.

Figure 7:
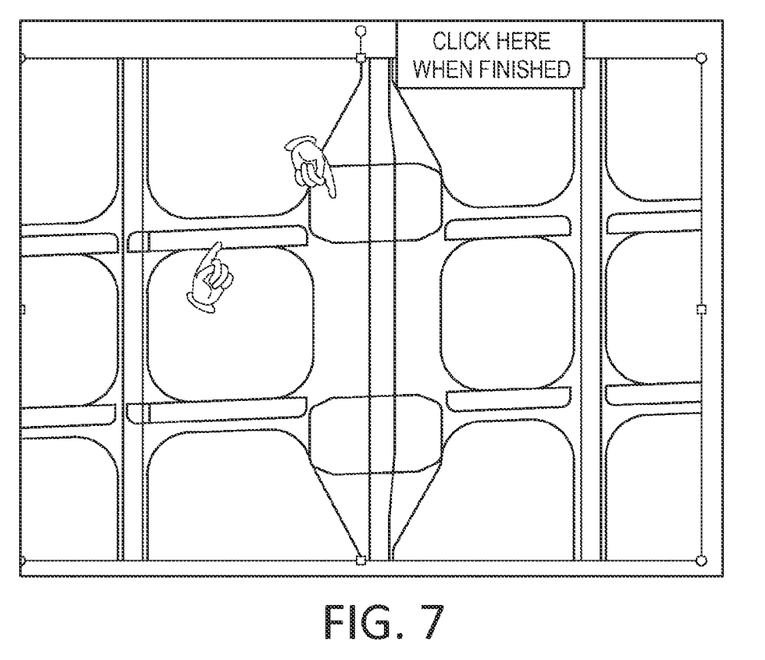
FIG. 7 shows an exemplary interactive damage selection screen generated on a portable computing device by software code in accordance with a preferred embodiment of the invention.
Figure 8:
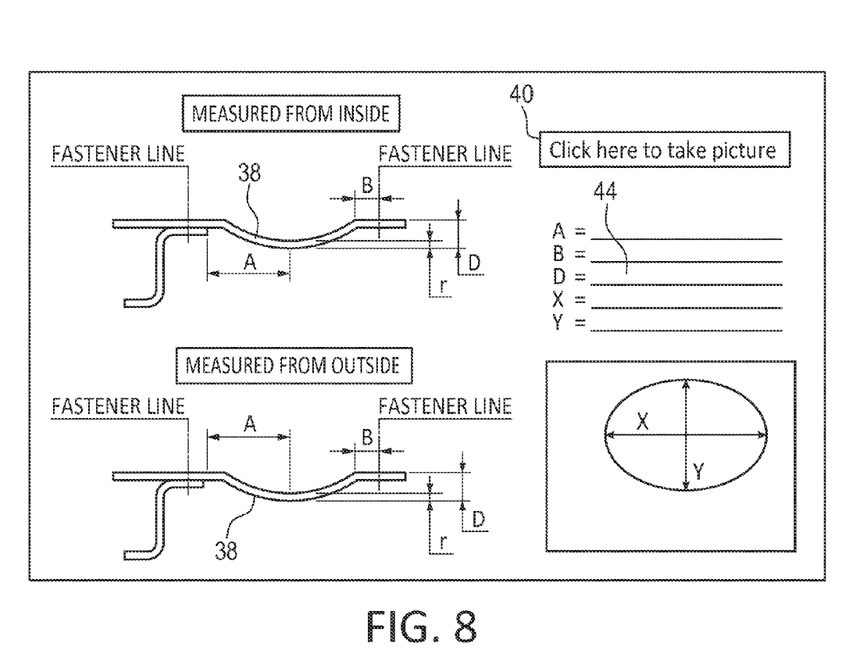
FIG. 8 shows an exemplary interactive part detail generated on a portable computing device by software code in accordance with a preferred embodiment of the invention.

FIG. 8 shows two views of a fastener 38 that was selected from FIG. 7. The fastener is shown in engineering detail as a clean part and measurement conventions for the clean (meaning undamaged) part is clearly labeled in the views. In the "measured from the inside" and "measured from the outside", the "A" value will be different in the case of non-access to the internal structure. "Measured from the outside" accounts for the potential inability to obtain an internal measurement. An active button 40 suggests that a picture of the corresponding damaged part be imaged for reporting purposes. Text fields corresponding to the measurement conventions for the part 38 are available to be filled out with data, so a user is guided to properly document the information about a damaged part and its variance from a clean part.

Figure 9:
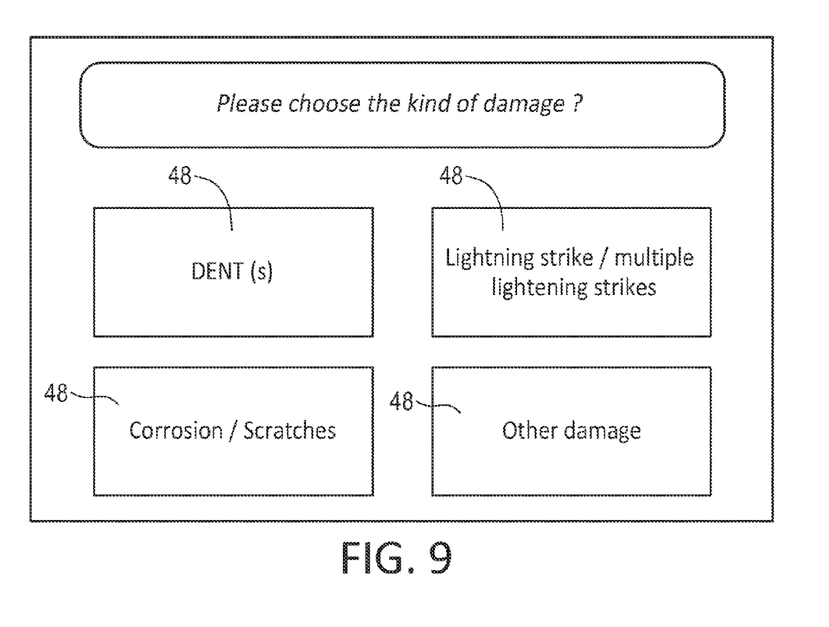
FIG. 9 shows an exemplary interactive damage event type recording screen generated on a portable computing device by software code in accordance with a preferred embodiment of the invention.
Figure 10:
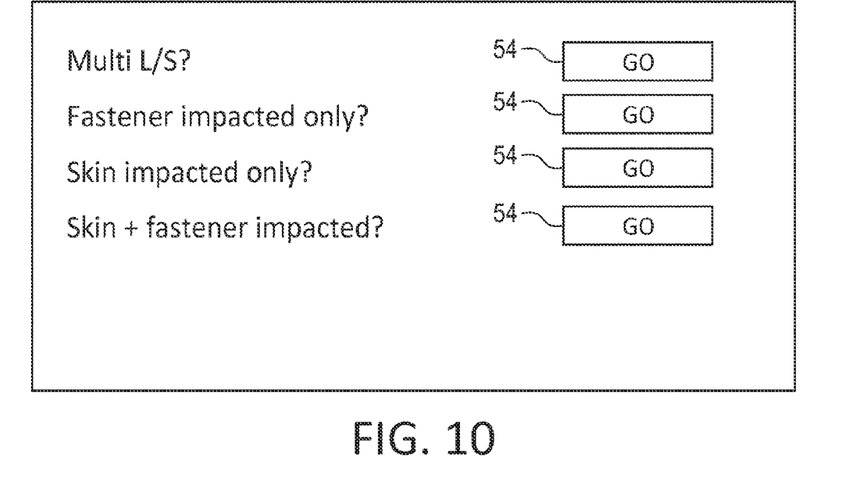
FIG. 10 shows an additional exemplary interactive damage event recording screen generated on a portable computing device by software code in accordance with a preferred embodiment of the invention.

FIG. 9 illustrates an additional screen that can be generated by the tablet device to record the particular type of damage event for the part, e.g., a lightning strike. In FIG. 9, a number of buttons 48 are shown for the type of damage, with three being specific to type of damage (dent, lightning strike, and corrosions/scratches) and one being reserved to select or input some other damage types. FIG. 10 shows additional selections, with buttons 54 to guide choices.

Figure 11A:
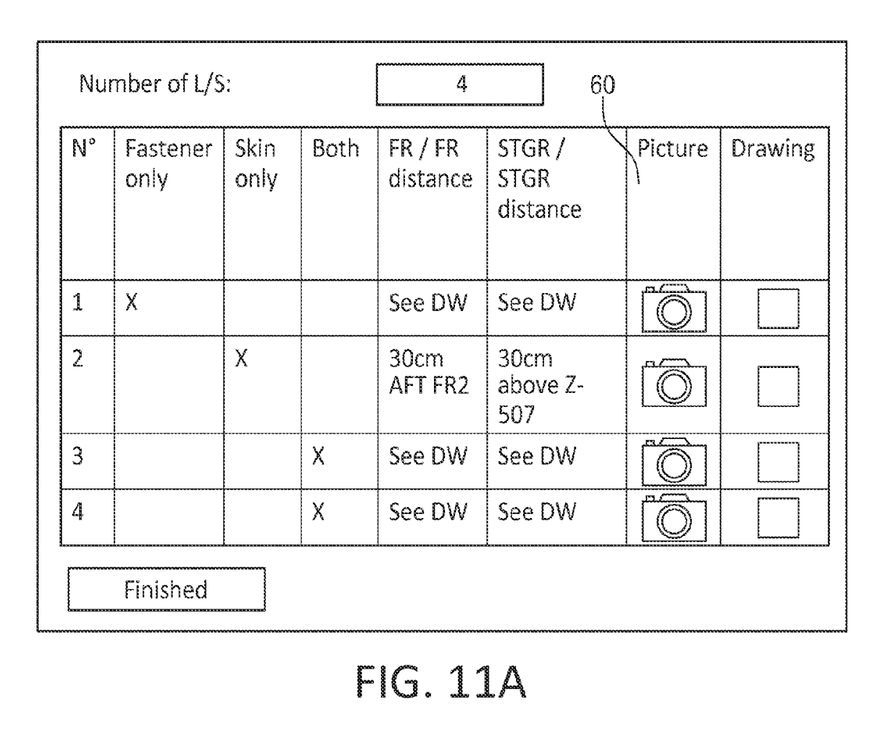
FIGS. 11A and 11B show exemplary interactive multiple damage event type recording screens generated on a portable computing device by software code in accordance with a preferred embodiment of the invention.
Figure 11B:
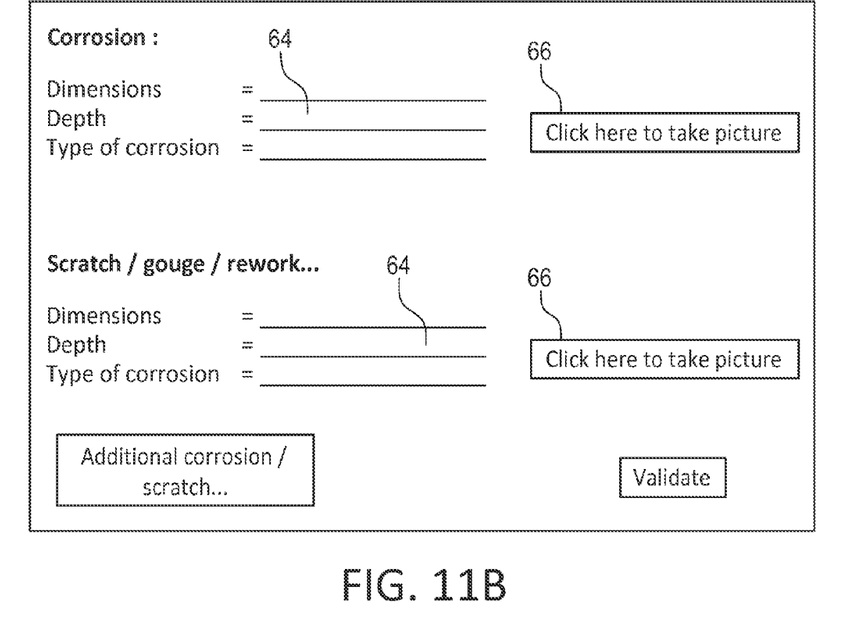

FIG. 11A illustrates a screen that can result from selections on previous screens, and which would result when multiple selections were made in FIG. 7 and/or multiple types of damages were selected in FIGS. 9 and 10. The L/S number of lightning strikes that were selected. A table 60 tracks indicated information for whether the skin or fastener or both were damaged. "FR" denotes frame, STGR denotes stringer, and DW denotes drawing. The cells are active, and also permit a picture of the applicable part to be taken or a drawing to be reviewed. FR/FR distance=the distance between a frame and the damage. STGR/STGR distance=the distance between a stringer and the damage. Z-507 is a reference number of a stringer in the detailed engineering drawing that can be used to help locate damage. FIG. 11B shows an additional screen that is used to document corrosion and scratch/gouge/rework damage. Active fields 64 are shown to be filled out. Picture buttons 66 are available for each. A validate button 68 provides a submission and check of data. An additional damage button 70 permits entry for more data. Generally, the interface of FIGS. 11A and 11B guides a user to provide necessary information to permit a repair study to determine a repair solution. For example, a picture is requested to provide information necessary to determine whether removal of an adjacent part is needed to ensure that no corrosion extends.

The tablet application provides access to full sets of engineering drawings for an aircraft. Using appropriate menus as in the examples above, users can be guided to identify the correct part, obtain and enter type and extent of damage information with guided menus and acquire photographs of the damaged part and/or sub assemblies.

Figure 12:
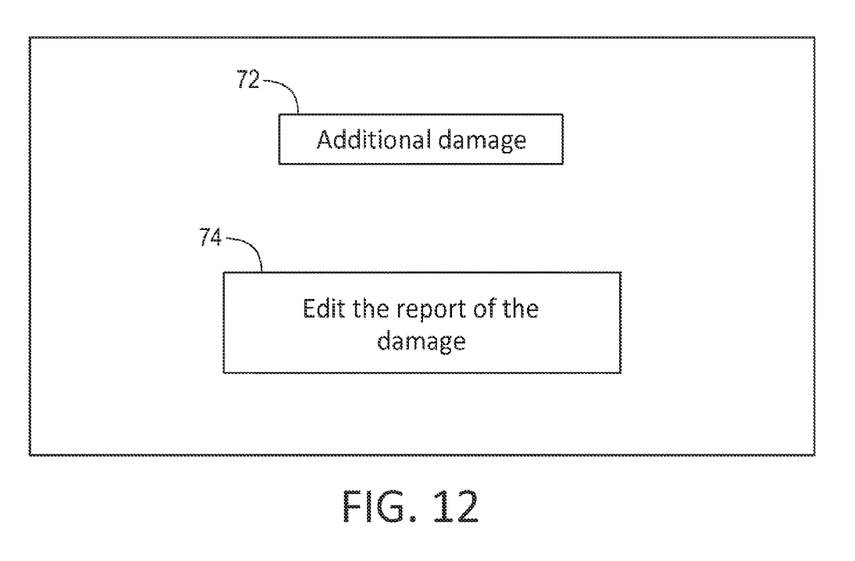
FIG. 12 shows an exemplary interactive additional damage event type recording screen generated on a portable computing device by software code in accordance with a preferred embodiment of the invention.
Figure 13:
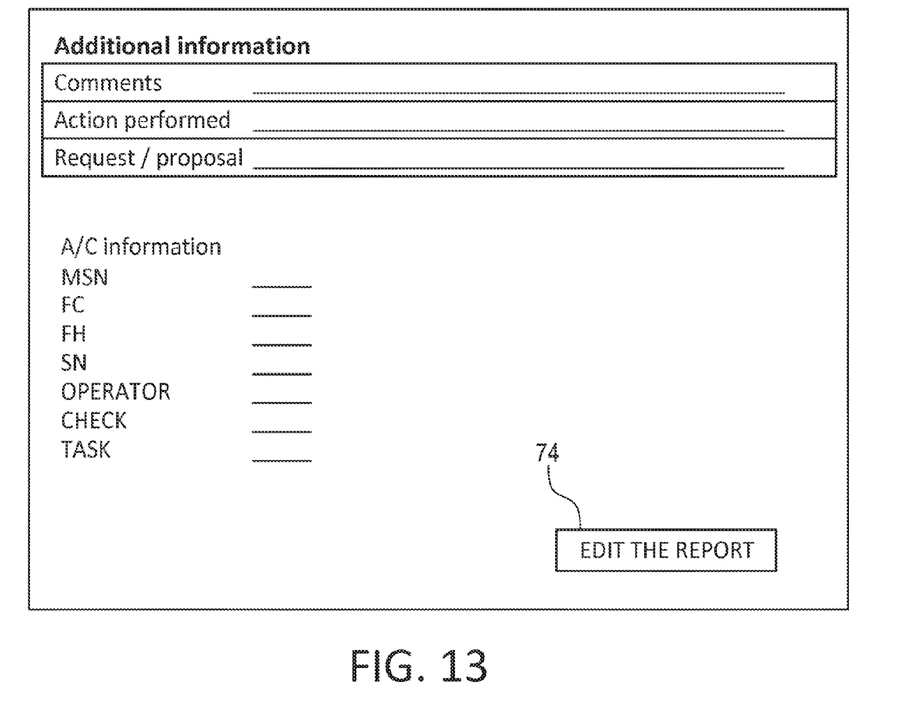
FIG. 13 shows an exemplary interactive damage event type reporting screen generated on a portable computing device by software code in accordance with a preferred embodiment of the invention.

FIG. 12 shows a view for when screens for damage of a particular part or subassembly have been completed. A button 72 can lead back to the main screen of FIG. 3 for the aircraft being inspected or any of the particular screens, such as screens previously used in FIGS. 4-7. Another button 74 permits editing of the damage report. FIG. 13 is a screen for entering additional information. The information includes, for example, comments, action descriptions and a request or proposal reference.

The data is transmitted to the aircraft manufacturer when the report is complete, and includes the MSN, FC, FH, SN, operator ID, a confirmation check and a task identification (e.g., a scheduled inspection identification. Associated photographs that are already matched with an exact clean part specification are also transmitted.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A method executed by computer code stored on a non-transient medium on a portable computing device including a graphical touch screen interface and a camera, the code causing the portable computer device to:
    display graphical interactive aircraft selection views that guide a user to select an aircraft family, then an aircraft, then a basic aircraft assembly section, and further refinement selections to reach an individual part of the aircraft to obtain data necessary for ordering the individual part with selections made via the touchscreen, wherein the views include engineering detail level drawings of assemblies and parts;
    guide user to select a type of damage, and enter information about the type of damage with reference to an engineering detail view of a clean version of a damaged assembly or part;
    matching user selections and entered information to actual specifications of the aircraft and the individual part from detailed aircraft specifications maintained by a supplier of the individual part identified from the engineering views,
    transmit data specifying damage and the actual specifications of the individual part to the supplier.

2. The method of claim 1, wherein the engineering detail level drawings are stored on read-only memory of the portable computing device.

3. The method of claim 2, wherein the engineering detail level drawings are restricted from uploading and copying.

4. The method of claim 1, wherein the code further causes the portable computer device to prompt a user to photograph a damaged part that has been identified and associates the photograph of a damaged part with a corresponding clean part engineering detail level drawing.

5. The method of claim 4, wherein the code further causes the portable computer device to associate entered type and severity of damage data with the photograph and the corresponding clean part engineering detail level drawing.

6. The method of claim 5, wherein the portable computer device comprises a tablet computer.

7. The method of claim 1, wherein the code generates engineering detail level drawings from an up-to-date database maintained by the supplier.

8. The method of claim 1, wherein the portable computer device communicates with a secure storage device on aircraft that stores the engineering level detail drawings.

9. The method of claim 8, wherein the secure storage device is located in a portion of the aircraft having physical access restrictions.

10. The method of claim 9, wherein the secure storage device stores data including design specifications, manufacturing events and damage reports.

11. The method of claim 1, wherein the code further causes the portable computer to automatically add aircraft identification values to a report that includes the data specifying damage.

12. The method of claim 1, wherein the code further causes the portable device to initially verify a user and permit access to the interactive aircraft selection views.

13. The method of claim 1, wherein the code limits the number of users and user access rights via a supplier validation.

14. The method of claim 13, wherein the code limits the number of users with an authentication step that includes reading a user badge with an imaging device of the portable computer.

* * * * *